United States Patent Office 2,704,292
Patented Mar. 15, 1955

2,704,292

4-[X-SULFAMYLANILINO]-1,X-DIHYDROXY-5(OR 8)-AMINOANTHRAQUINONES

Milton L. Hoefle, Roseville, Mich., and David I. Randall and Edgar E. Renfrew, Easton, Pa., assignors to General Aniline & Film Corporation, New York, N. Y., a corporation of Delaware No Drawing. Application October 19, 1953,
Serial No. 387,054

6 Claims. (Cl. 260—373)

The present invention relates to aminoanthraquinone dyestuffs and particularly to a new class of 4-[x-sulfamylanilinol]-1,x-dihydroxy - 5(or 8) - aminoanthraquinones having new and valuable properties.

Several blue anthraquinone dyestuffs prepared by the condensation of 4,5-dinitrochrysazine or 4,8-dinitroanthrarufin with aromatic amines, such as aniline, toluidine, aminoethyl benzene, aminoacetophenone, aminocresol, aminophenol, sulfanilamide, p-anisidine, p-phenylenediamine and 2,5-dimethoxyaniline have been reported in the early art. While the gas fastness of these dyestuffs on acetate rayon was found to be quite good, these compounds suffered from the standpoint of not possessing appreciable affinity for cellulose acetate and hence were not used in the trade. Considerable research has been conducted to find the causes underlying this defect and to improve substantivity of gas-resistant types.

We have discovered that by reducing the remaining nitro group to amino of a dyestuff containing a substituted sulfonamide group in either o-, m-, or p-position of the benzene nucleus of the anilino group attached to the 4-position of either 5-nitrochrysazine or 8-nitroanthrarufin, dyestuffs are obtained which not only dye cellulose acetate and other textile materials, such as "Dacron" and the like, in bright blue shades but are also extremely fast to light and acidic fumes. The fabrics dyed with such dyestuffs do not fade in color, retaining their original shade under severe testing. This unusual property is evidently enhanced by the presence of a substituted sulfonamide group in the aforestated positions of the anilino group. In other words, the presence of the amino group imparts better brightness and substantivity to the dye, and sulfonamide group apparently enhances the substantivity and increases the ability to resist gas fumes.

The dyestuffs having the foregoing properties are characterized by the following general formula:

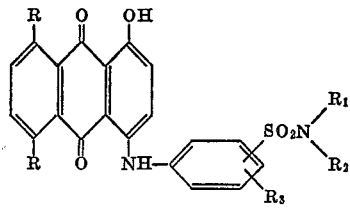

wherein R represents either hydroxy or an amino group, one of the R's being hydroxy and the other is amino, $R_1$ represents either hydrogen, cyanoalkyl, or a hydroxyalkyl group in which the alkyl groups have from 2 to 3 carbon atoms, $R_2$ represents a hydroxyalkyl or cyanoalkyl group of the same value as $R_1$, $R_3$ represents either hydrogen or lower alkyl group, such as methyl, ethyl, propyl and butyl.

The dyestuffs characterized by the foregoing general formula are prepared by reducing the dyestuffs obtained by condensing 4,5-dinitrochrysazine or 4,8-dinitroanthrarufin with amino-N-hydroxyalkylbenzenesulfonamides in the presence of nitrobenzene at a temperature of 160°–210° C. for 1 to 9 hours with stirring as disclosed and fully described in our application Serial No. 328,815 filed on December 30, 1952. By reference to this application sufficient and detailed examples are given of the preparation of 4-[x-sulfamylanilinol]-1,x-dihydroxy-5-(or 8)-nitroanthraquinones, each of which is employed in the preparation of the 4-[x-sulfamylanilinol]-1,x-dihydroxy-5(or 8)-aminoanthraquinones of the present invention.

In practicing the present invention, one molecular equivalent of any one of the 4-[x-sulfamylanilinol]-1,x-dihydroxy-5(or 8)-nitroanthraquinones disclosed and described in our aforesaid application is treated with 1.5 molecular equivalents of sodium sulfide in aqueous suspension at a temperature of 85–95° C. for a period of time ranging from ½ to 1½ hours. The reaction mixture is allowed to cool to room temperature and filtered to remove the dyestuff. The removed dyestuff is washed once or twice with water and dried by conventional means. Instead of sodium sulfide, an equivalent amount of glucose may be used and the reaction conducted in alkaline-aqueous suspension at a temperature of 65–75° C. for about ½ to 1 hour.

The following examples will describe the preparation of some of the dyestuffs characterized by the foregoing general formula. It is to be understood that they are merely illustrative and that the invention claimed herein is not to be regarded as being restrictive thereto. All the parts given are by weight unless otherwise stated.

*Example I*

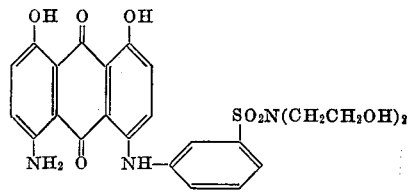

Into a reaction flask equipped with a stirrer and thermometer was charged 3.0 parts $N^3$[(4,5-dihydroxy-8-nitro-1-anthraquinonyl)]-$N^1$,$N^1$ - bis(2 - hydroxyethyl) metanilamide and 350 parts water. The reaction mixture was heated to 95° C., and then 5.0 parts sodium sulfide (Na₂S·9H₂O) was added. The reaction mixture was heated at 95° C. for one hour, and it was then allowed to cool to room temperature and filtered to remove the product. When dried, the yield was 1.8 parts of product which dyed acetate rayon in bright blue shades possessing good light and gas.

*Example II*

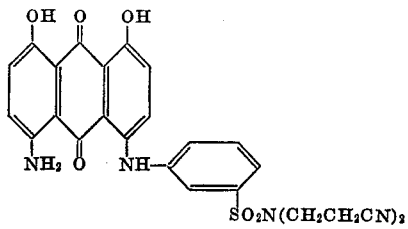

Into a reaction flask equipped with a thermometer and stirrer was added 20 parts of $N^3$[(4,5-dihydroxy-8-nitro-1-anthraquinonyl)]$N^1$,$N^1$-bis(2 - cyanoethyl)metanilamide and 2000 parts water. This suspension was heated to 95° C. and 40 parts sodium sulfide (Na₂S·9H₂O) was added. The reaction mixture was heated to 95° C. for forty-five minutes. Then 10 parts ammonium chloride was added, and the reaction mixture was cooled and filtered to remove the product. The product was washed with water and then dried at 60° C. The product weighed 15 parts; it dyed acetate rayon in fast blue shades.

*Example III*

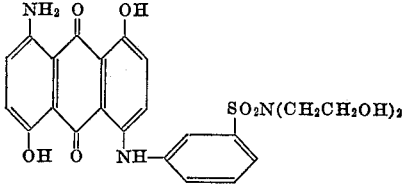

Into a suitable reaction flask equipped with a thermometer and stirrer was placed 5.0 parts $N^3$[(4,8-dihydroxy-5-nitro - 1 - anthraquinonyl)]-$N^1,N^1$-bis(2-hydroxyethyl)metanilamide and 150 parts water. This mixture was heated to 75° C. and 7.5 parts glucose and 2.5 parts sodium hydroxide were added. The reaction mixture was maintained at this temperature for forty-five minutes. The product separated out as a solid. Upon cooling, the product was removed by filtration and washed with warm water. Upon drying, 3.5 parts of product were obtained which dyed acetate rayon and Dacron in bright blue shades which possessed excellent fastness properties.

*Example IV*

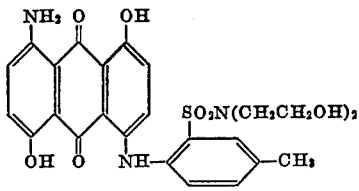

Example I was repeated with the exception that 3 parts $N^3$[(4,5 - dihydroxy-8-nitro-1-anthraquinonyl)]-$N^1,N^1$-bis-(2-hydroxyethyl)metanilamide was replaced by 3.1 parts of $N^2$[(4,8-dihydroxy-5-nitro-1-anthraquinonyl)] - $N^1,N^1$ - bis(2-hydroxyethyl) - 5 - methyl-orthanilamide. Upon drying 2 parts of product were obtained which dyed acetate rayon and Dacron in bright blue shades which possessed excellent fastness properties.

*Example V*

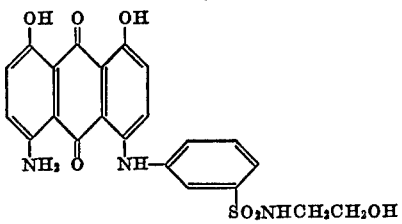

Example I was repeated with the exception that 3 parts of $N^3$[(4,5-dihydroxy-8-nitro-1- anthraquinonyl)]-$N^1,N^1$-bis(2-hydroxyethyl)metanilamide was replaced by 2.8 parts of $N^3$[(4,5-dihydroxy-8-nitro - 1 - anthraquinonyl)]-$N^1$-(2-hydroxyethyl)metanilamide. Upon drying 2.2 parts of product were obtained which dyed acetate rayon and Dacron in bright blue shades which possessed excellent fastness properties.

As many apparently widely different embodiments of this invention may be made without departing from the spirit and scope thereof, it is to be understood that we do not wish to limit ourselves to the specific embodiments thereof except as defined by the appended claims.

We claim:

1. Dyestuffs characterized by the formula selected from the class consisting of the following general formulae:

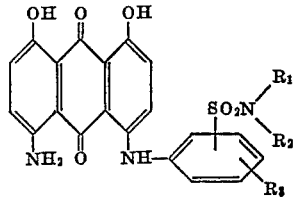

and

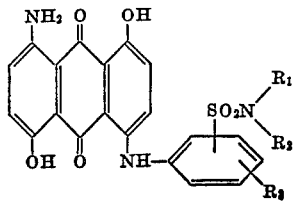

wherein $R_1$ represents a member selected from the class consisting of hydrogen, lower hydroxyalkyl, and lower cyanoalkyl groups, $R_2$ represents a member selected from the class consisting of lower hydroxyalkyl and lower cyanoalkyl groups, and $R_3$ represents a member selected from the class consisting of hydrogen and lower alkyl groups.

2. A dyestuff having the following formula:

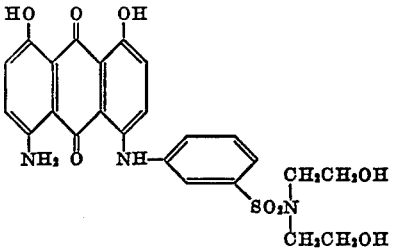

3. A dyestuff having the following formula:

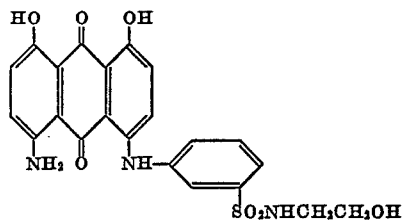

4. A dyestuff having the following formula:

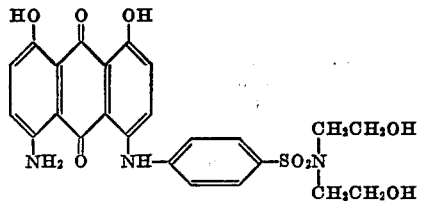

5. A dyestuff having the following formula:

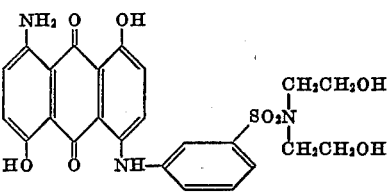

6. A dyestuff having the following formula:

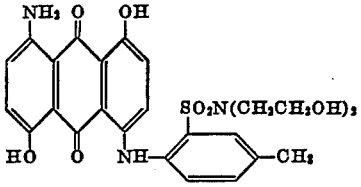

References Cited in the file of this patent

UNITED STATES PATENTS 2,480,269    Seymour et al. _____ Aug. 30, 1949